Patented Feb. 1, 1927.

1,616,144

UNITED STATES PATENT OFFICE.

WALTER SCHOELLER AND MAX GEHRKE, OF BERLIN, GERMANY, ASSIGNORS TO THE FIRM: CHEMISCHE FABRIK AUF ACTIEN (VORM. E. SCHERING), OF BERLIN, GERMANY.

PHARMACEUTICAL PRODUCT CONTAINING ARSENIC AND PROCESS OF MAKING SAME.

No Drawing. Application filed June 22, 1925, Serial No. 38,902, and in Germany July 2, 1924.

Our invention relates to pharmaceutical products and more especially to arsonic acid derivatives and to the method of making same.

In treating an alkaline solution of p-hydroxy-m-amino-benzene arsonic acid at 0° C. with a solution of phosgene in toluene Fargher (Journ. Chem. Soc. 115 (1919), p. 891) obtained 1.2-dihydro benzoxazolon-4-arsonic acid the arsenic contents of which was found to be 28.6 per cent against 28.9 per cent as calculated.

We have now ascertained that, contrary to what could be expected, when working without any cooling and preferably at a temperature between 25 and 80 degr. C., there results the symmetrical urea of p-hyroxy-m-amino benzene arsonic acid the arsenic contents of which was ascertained to be 30.2 per cent, as against a theoretical contents of 30.4 per cent. This compound corresponds to the formula

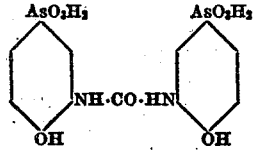

As compared with for instance p-hydroxy-m-acetyl-aminobenzene arsonic acid, it is more permanently effective and has a higher chemotherapeutic coefficient as no saponification occurs in the organism.

Example.—If phosgene is allowed to act at about 50° C., preferably in the presence of sodium acetate and vigorous stirring on 7.9 grams p-hydroxy-m-amino-benzenearsonic acid (see Berichte d. deutsch. Chem. Ges. 45, 757), until the faculty of diazotization is exhausted, and the solution is acidulated, there is obtained the symmetrical carbonyl urea of p-hydroxy-m-amino-benzenearsonic acid which on being thoroughly washed and recrystallized from hot water forms a yellowish-white substance soluble in alkalis and insoluble in the usual organic solvents.

We wish it to be be understood that we do not desire to be limited to the exact substances, proportions and sequence of operations described in the example, for obvious modifications will occur to a person skilled in the art.

We claim:—

1. As a new product, the symmetric urea of p-hydroxy-m-amino-benzenearsonic acid, being soluble in alkalis, insoluble in the usual organic solvents and being more permanently efficient and having a higher chemotherapeutic coefficient than p-hydroxy-m-acetyl-aminobenzenearsonic acid, the said compound corresponding to the formula

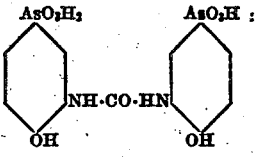

2. The method of making a symmetric urea of p-hydroxy-m-amino-benzenearsonic acid, comprising acting on said acid with phosgene in an alkaline solution while avoiding cooling the reaction mixture.

In testimony whereof we affix our signatures.

WALTER SCHOELLER.
MAX GEHRKE.